United States Patent
Akesson et al.

(10) Patent No.: US 9,349,294 B2
(45) Date of Patent: May 24, 2016

(54) VEHICLE SAFETY ARRANGEMENT AND METHOD

(71) Applicant: VOLVO CAR CORPORATION, Gothenburg (SE)

(72) Inventors: Anders Akesson, Frillesas (SE); Mattias Bengtsson, Billdal (SE)

(73) Assignee: Volvo Car Corporation, Gothenburg (SE)

( * ) Notice: Subject to any disclaimer, the term of this patent is extended or adjusted under 35 U.S.C. 154(b) by 39 days.

(21) Appl. No.: 14/280,854

(22) Filed: May 19, 2014

(65) Prior Publication Data

US 2014/0350790 A1    Nov. 27, 2014

(30) Foreign Application Priority Data

May 27, 2013   (EP) ..................................... 13169358

(51) Int. Cl.
| | |
|---|---|
| *B60W 30/08* | (2012.01) |
| *G08G 1/16* | (2006.01) |
| *B60W 10/20* | (2006.01) |

(Continued)

(52) U.S. Cl.
CPC ............... *G08G 1/167* (2013.01); *B60W 10/20* (2013.01); *B60W 30/085* (2013.01); *B60W 30/0956* (2013.01); *B62D 15/0265* (2013.01); *B60W 2050/0002* (2013.01); *B60W 2540/18* (2013.01);

(Continued)

(58) Field of Classification Search
USPC ........... 701/301, 41, 1, 119, 26, 24, 300, 302, 701/96; 340/902, 903, 435, 436
See application file for complete search history.

(56) References Cited

U.S. PATENT DOCUMENTS 6,317,693 B2 * 11/2001 Kodaka et al. ................. 701/301
6,353,788 B1 * 3/2002 Baker et al. ...................... 701/96

(Continued)

FOREIGN PATENT DOCUMENTS

| DE | 102005005412 | 8/2006 |
|---|---|---|
| DE | 102011108292 | 4/2012 |
| WO | 2013083343 | 6/2013 |

OTHER PUBLICATIONS

Machine Translation of DE102005005412 A1, Thomas Dr. Barthenheir, http://www.google.com.vc/patents/DE102005005412A1?cl=en (last visited Aug. 19, 2015).*

(Continued)

*Primary Examiner* — Thomas Tarcza
*Assistant Examiner* — Richard Goldman
(74) *Attorney, Agent, or Firm* — Brooks Kushman P.C.

(57) ABSTRACT

Embodiments herein relate to a vehicle safety arrangement and method for preventing or mitigating accidents when turning across lanes with oncoming traffic in a vehicle including an Electrical Power Assisted Steering (EPAS). Oncoming traffic in one or more adjacent lanes and other vehicles approaching from behind are detected by forward and rearward looking detection systems respectively. An intention to turn across an adjacent lane is determined. Standstill of the host vehicle is determined. A control unit is arranged to, during determined standstill and a determined intention to turn across a lane containing oncoming traffic, determine if a risk of the host vehicle being hit from behind is high, and if so determined, generate and send a control signal to an EPAS control unit, which, in response to receiving such a control signal, is arranged to cause the EPAS to align the steerable wheels of the host vehicle.

10 Claims, 4 Drawing Sheets

(51) Int. Cl.
*B60W 30/085* (2012.01)
*B60W 30/095* (2012.01)
*B62D 15/02* (2006.01)
*B60W 50/00* (2006.01)

(52) U.S. Cl.
CPC ...... *B60W 2550/14* (2013.01); *B60W 2550/402* (2013.01)

(56) References Cited

U.S. PATENT DOCUMENTS

| | | | | |
|---|---|---|---|---|
| 6,459,991 | B1* | 10/2002 | Takiguchi et al. | 701/301 |
| 7,885,766 | B2* | 2/2011 | Sugimoto et al. | 701/301 |
| 8,874,320 | B2* | 10/2014 | Barthomeuf et al. | 701/42 |
| 2005/0033516 | A1* | 2/2005 | Kawasaki | 701/301 |
| 2007/0293996 | A1* | 12/2007 | Mori et al. | 701/23 |
| 2010/0063736 | A1* | 3/2010 | Hoetzer | 701/301 |
| 2010/0114467 | A1* | 5/2010 | Samuel et al. | 701/119 |
| 2010/0169016 | A1* | 7/2010 | Kodali | 701/301 |
| 2010/0253597 | A1* | 10/2010 | Seder et al. | 345/7 |
| 2010/0292886 | A1* | 11/2010 | Szczerba et al. | 701/29 |
| 2011/0054716 | A1* | 3/2011 | Stahlin et al. | 701/1 |
| 2011/0178710 | A1* | 7/2011 | Pilutti et al. | 701/301 |
| 2013/0338877 | A1* | 12/2013 | Straus | 701/41 |
| 2014/0350790 | A1* | 11/2014 | Akesson et al. | 701/41 |
| 2015/0149037 | A1* | 5/2015 | Lim et al. | 701/41 |

OTHER PUBLICATIONS

Extended European Search Report for EP 131693581, Completed by the European Patent Office, Dated Oct. 21, 2013, 8 Pages.
Website http://www.verkehrsportal.de/board/index.php?showtopic=81635 Internet Citation Dated Jan. 10, 2010, Retrieved on May 16, 2014, XP002690334, 22 Pages.

* cited by examiner

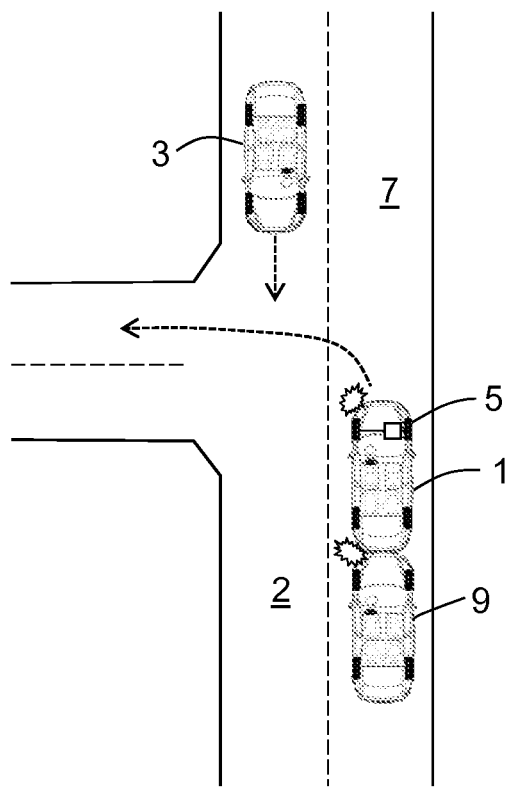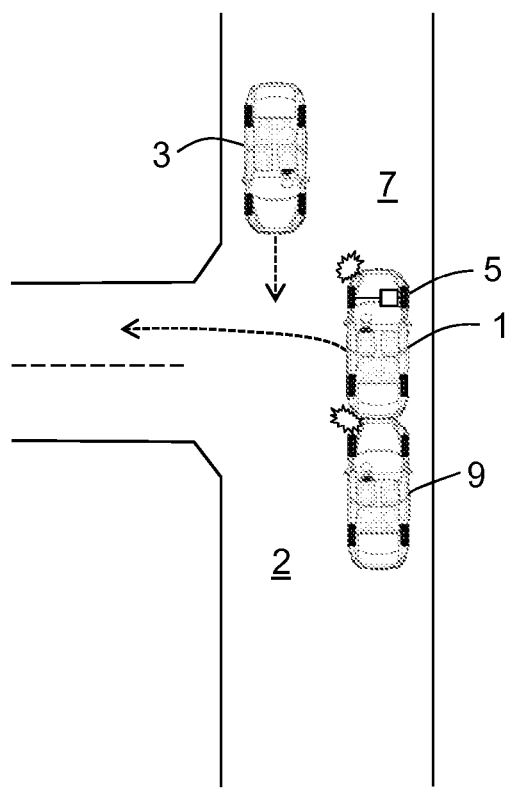
Fig. 4a                    Fig. 4b

VEHICLE SAFETY ARRANGEMENT AND METHOD

CROSS-REFERENCE TO RELATED APPLICATIONS

This application claims foreign priority benefits under 35 U.S.C. §119(a)-(d) to European patent application number EP 13169358.2 filed May 27, 2013, which is incorporated herein by reference in its entirety.

TECHNICAL FIELD

Embodiments herein relate to a vehicle safety arrangement for preventing or mitigating accidents when turning across lanes with oncoming traffic in a vehicle hosting the arrangement, the host vehicle further comprising an Electrical Power Assisted Steering operable to steer one or more wheels of the host vehicle.

Further embodiments herein relate to a method for preventing or mitigating accidents when turning a host vehicle across lanes with oncoming traffic, the host vehicle further comprising an Electrical Power Assisted Steering operable to steer one or more wheels of the host vehicle.

Still further embodiments herein relate to a motor vehicle comprising a vehicle safety arrangement for preventing or mitigating accidents when turning across lanes with oncoming traffic in a vehicle hosting the arrangement, the host vehicle further comprising an Electrical Power Assisted Steering operable to steer one or more wheels of the host vehicle.

BACKGROUND

In right-hand traffic countries the left turn is perhaps the most dangerous of driving maneuvers, simply due to its nature, i.e. you are turning, often from a standstill, across another lane of traffic that's moving in the opposite direction.

Vehicles turning left into oncoming traffic result in many injuries and even fatalities at intersections. When you turn left, you are crossing one or more lanes of oncoming traffic, presenting your vehicle's broadside to any approaching vehicles. Thus, especially the passenger's side front seat is put into harm's way. If your turning vehicle gets struck, any occupant of the passenger's side front seat takes the most severe impact. Due to the geometry of passenger cars, the protection afforded by the vehicle body against a side impact is usually substantially less than that provided against a front- or rear-end impact.

Also, it is possible that another vehicle will attempt to overtake you while you are preparing to turn. Thus, your vehicle may get struck by the overtaking vehicle should you proceed with the turning maneuver.

Furthermore, when waiting to make a left turn drivers sometime tend to turn their wheels slightly left. As a result thereof the vehicle could be pushed into oncoming traffic if accidentally hit from behind by another vehicle.

In left-hand traffic countries the above applies conversely for right turns.

SUMMARY

Embodiments herein aim to provide an improved vehicle safety arrangement for preventing or mitigating accidents when turning across lanes with oncoming traffic in a vehicle hosting the arrangement, the host vehicle further comprising an Electrical Power Assisted Steering operable to steer one or more wheels of the host vehicle.

This is provided through the arrangement comprising: one or more forward-looking detection systems for detecting oncoming traffic in one or more lanes adjacent to the lane travelled by the host vehicle; one or more rearward-looking detection systems for detecting other vehicles approaching the host vehicle from behind; one or more turning intention detection systems for determining an intention to turn across an adjacent lane; means for determining standstill of the host vehicle: a control unit arranged to, during determined standstill of the host vehicle and a determined intention to turn across a lane containing oncoming traffic, determine a risk of the host vehicle being hit from behind; and, upon determining a high risk of the host vehicle being hit from behind, generate and send a control signal to a vehicle Electrical Power Assisted Steering control unit, which Electrical Power Assisted Steering control unit, in response to receiving such a control signal, is arranged to cause the Electrical Power Assisted Steering to align the steerable wheels of the host vehicle.

The provision to align the steerable wheels of the host vehicle during determined standstill of the host vehicle and a determined intention to turn across a lane containing oncoming traffic upon determining a high risk of the host vehicle being hit from behind is ensured that any pushing of the host vehicle as a result of the host vehicle being hit by another vehicle from behind, will only cause the vehicle to move straight forward in the current lane, and thus not turn into a lane containing oncoming traffic and potentially suffer a secondary collision therewith.

According to a second aspect the one or more forward-looking detection systems comprises one or more of a radar sensor, a laser sensor, a lidar sensor, an ultrasound sensor, an infrared sensor, one or several image sensors, or any combination thereof The provision of a one or more of these sensors provides for facilitates cost efficient realization of the arrangement as determination can be made using sensors that are normally already present in today's vehicles.

According to a third aspect the one or more rearward-looking detection systems comprises one or more of a radar sensor, a laser sensor, a lidar sensor, an ultrasound sensor, an infrared sensor, one or several image sensors, or any combination thereof The provision of a one or more of these sensors facilitates cost efficient realization of the arrangement as determination can be made using sensors that are normally already present in today's vehicles.

According to a fourth aspect the one or more turning intention detection systems are arranged to determine an intention to turn across an adjacent lane from one or more parameters, such as left or right hand steering wheel movement, turning of the steerable wheels of the host vehicle, steering angle, information on the extension of the road from at least one of a camera sensor, a map data system and a navigation system.

The provision of determining an intention to turn across an adjacent lane from one or more of the above parameters facilitates cost efficient realization of the arrangement as determination can be made using sensors that are normally already present in today's vehicles.

According to a fifth aspect the means for determining standstill are arranged to determine standstill of the host vehicle from at least one of a vehicle speed sensor, two or more vehicle speed sensors, a transmission sensor and a navigation system.

Determining standstill of the host vehicle in this way is a simple and cost efficient manner using sensors that are normally already present in today's vehicles.

According to a sixth aspect the control unit further is arranged to determine the risk of the host vehicle being hit from behind based on fused information from two or more sensors of the rearward-looking detection systems.

Determining the risk of the host vehicle being hit from behind based on fused information from two or more sensors provides for a simple and reliable high quality determination while enabling use of reasonably priced sensors, possibly sensors that are normally already present in today's vehicles.

According to a seventh aspect the control unit further is arranged to, upon determining the risk of the host vehicle being hit from behind, weight in the risk of the host vehicle being pushed into an adjacent lane containing oncoming traffic if being hit from behind.

Weighting in the risk of the host vehicle being pushed into an adjacent lane containing oncoming traffic, if being hit from behind, provides for a risk determination that accounts also for the consequences of the host vehicle being hit from behind.

According to an eight aspect the arrangement further comprises means for determining an intention to resume forward travel of the host vehicle, and in that the control unit further is arranged to release the aligning of the steerable wheels of the host vehicle in response to such intention to resume forward travel being determined.

Releasing the aligning of the steerable wheels of the host vehicle in response to determining an intention to resume forward travel of the host vehicle enables a driver or an autonomous travel control arrangement to override the vehicle safety arrangement should there for some reason be a need to.

According to a ninth aspect is further provided a method for preventing or mitigating accidents when turning a host vehicle across lanes with oncoming traffic, the host vehicle further comprising an Electrical Power Assisted Steering operable to steer one or more wheels of the host vehicle, comprising the steps of: detecting oncoming traffic in one or more lanes adjacent to the lane travelled by the host vehicle using one or more forward-looking detection systems; detecting other vehicles approaching the host vehicle from behind using one or more rearward-looking detection systems; determining an intention to turn across an adjacent lane using one or more turning intention detection systems; determining standstill of the host vehicle using means for determining standstill of the host vehicle; arranging a control unit to, during determined standstill of the host vehicle and a determined intention to turn across a lane containing oncoming traffic, determine a risk of the host vehicle being hit from behind; and, upon determining a high risk of the host vehicle being hit from behind, generate and send a control signal to a vehicle Electrical Power Assisted Steering control unit, and arranging the Electrical Power Assisted Steering control unit to, in response to receiving such a control signal, cause the Electrical Power Assisted Steering to align the steerable wheels of the host vehicle.

Through the provision of a method to align the steerable wheels of the host vehicle during determined standstill of the host vehicle and a determined intention to turn across a lane containing oncoming traffic upon determining a high risk of the host vehicle being hit from behind is ensured that any pushing of the host vehicle as a result of the host vehicle being hit by another vehicle from behind, will only cause the vehicle to move straight forward in the current lane, and thus not turn into a lane containing oncoming traffic and potentially suffer a secondary collision therewith.

According to a tenth aspect a motor vehicle is provided which comprises a vehicle safety arrangement aligning the steerable wheels of the host vehicle during determined standstill of the host vehicle and a determined intention to turn across a lane containing oncoming traffic upon determining a high risk of the host vehicle being hit from behind, as described herein.

A motor vehicle comprising a vehicle safety arrangement as described herein will provide improved safety through ensuring that any pushing of the host vehicle as a result of the host vehicle being hit by another vehicle from behind, will only cause the vehicle to move straight forward in the current lane, and thus not turn into a lane containing oncoming traffic and potentially suffer a secondary collision therewith.

BRIEF DESCRIPTION OF THE DRAWINGS

In the following, embodiments herein will be described in greater detail by way of example only with reference to attached drawings, in which

FIG. 4a is a schematic illustration of a motor vehicle comprising a vehicle safety arrangement according to embodiments hereof being struck from behind by another vehicle when preparing to turn left at an intersection.

FIG. 4b is a schematic illustration of the motor vehicle comprising a vehicle safety arrangement according to embodiments hereof of FIG. 4a simply being pushed forward in its own lane as a result of being struck from behind by the other vehicle.

Figure 1:
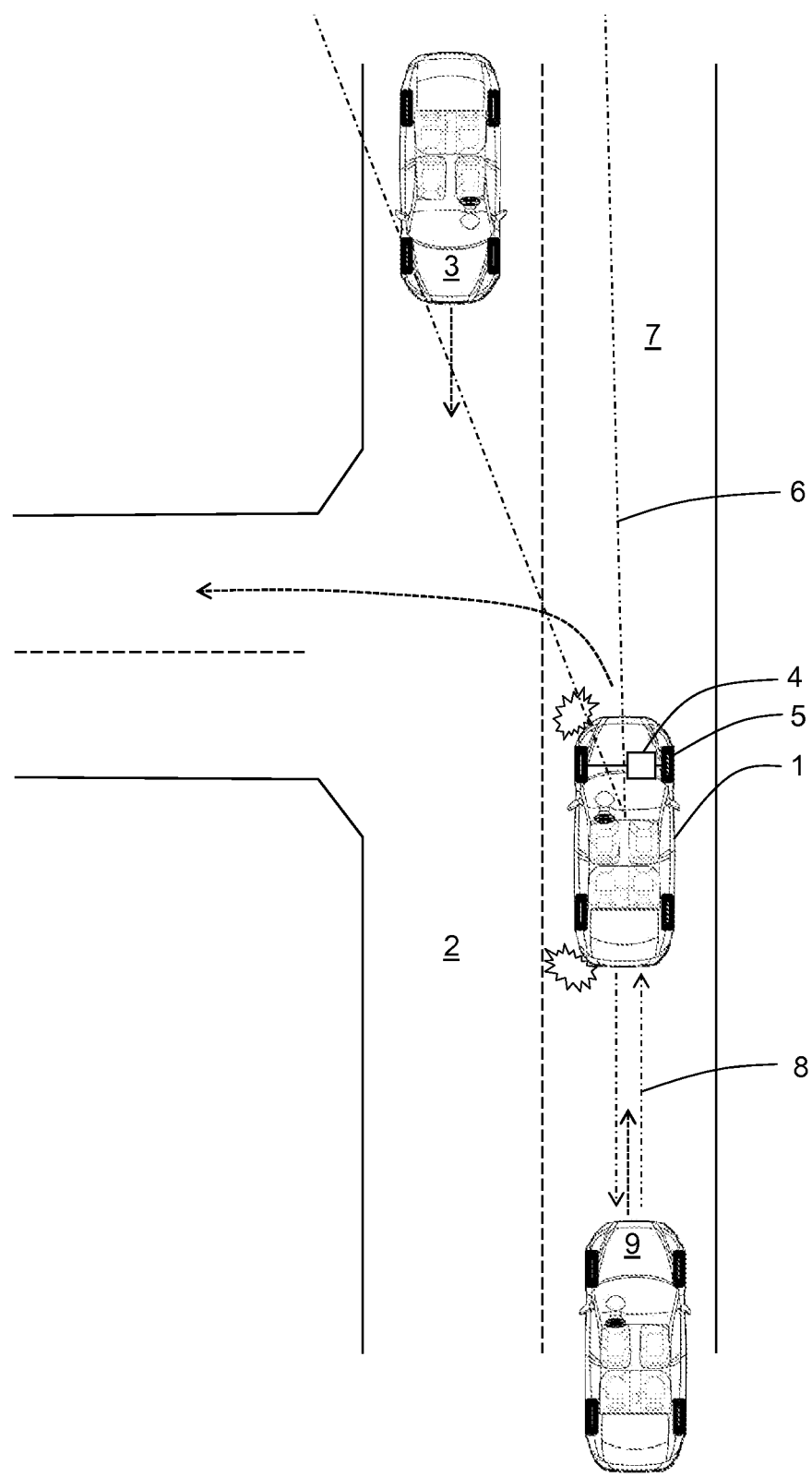
FIG. 1 is a schematic illustration of a motor vehicle comprising a vehicle safety arrangement according to embodiments hereof preparing to turn left at an intersection.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein. Throughout the disclosure, like reference numerals have been used to represent identical or corresponding parts.

DETAILED DESCRIPTION

The disclosure will, in the following, be exemplified by embodiments. It should however be realized that the embodiments are included in order to explain principles of the disclosure and not to limit the scope of the disclosure, defined by the appended claims. Details from two or more of the embodiments may be combined with each other.

FIG. 1 is a schematic illustration of a motor vehicle 1 comprising a vehicle safety arrangement according to embodiments hereof preparing to turn left at an intersection. The vehicle 1 hosting the vehicle safety arrangement has stopped in its lane 7 and the driver or, in the case of an autonomous vehicle, an autonomous travel control arrangement is preparing to turn left. There is, however, oncoming traffic 3 in the adjacent lane 2, which the vehicle will have to cross in order to reach the connecting road for onward travel.

Figure 2:
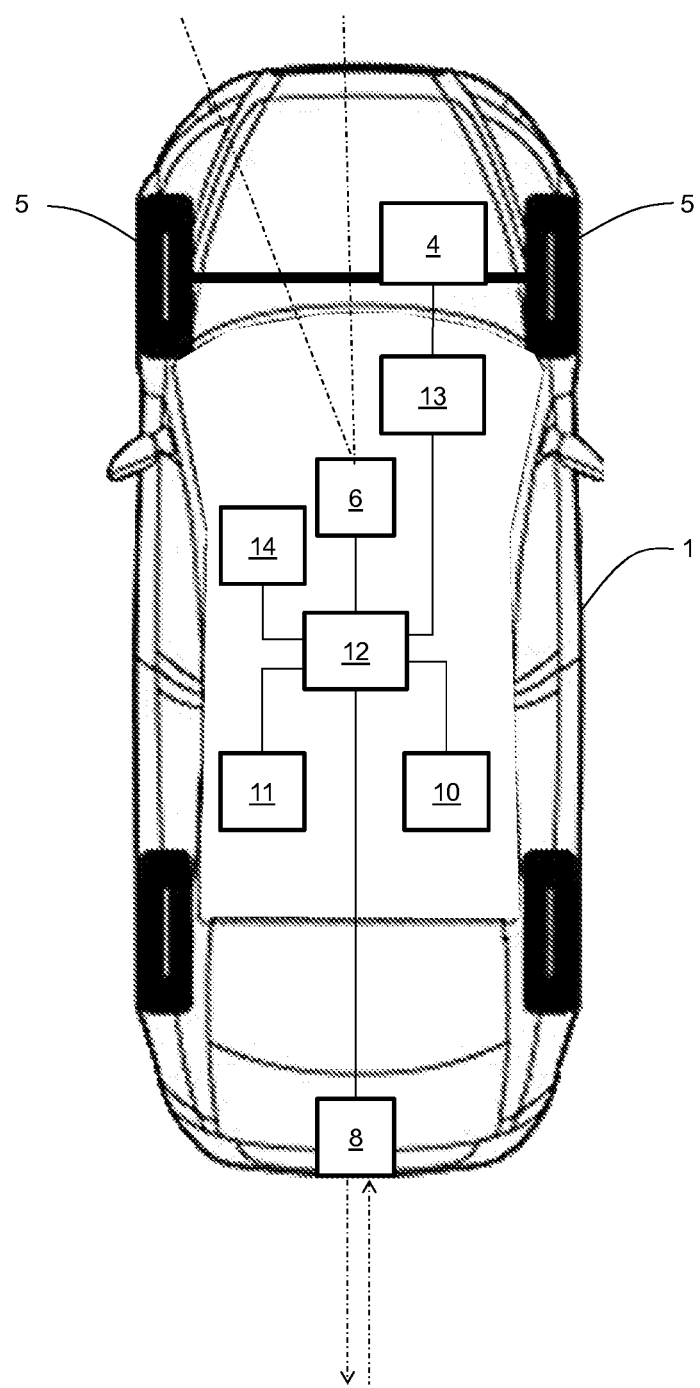
FIG. 2 is a schematic illustration of a vehicle safety arrangement according to embodiments hereof

The vehicle safety arrangement for preventing or mitigating accidents when turning across lanes 2 with oncoming traffic 3 will be explained in further detail with reference to FIG. 2.

The vehicle 1 hosting the arrangement further comprises an Electrical Power Assisted Steering (EPAS) 4 operable to steer one or more wheels 5 of the host vehicle 1.

The vehicle safety arrangement comprises one or more forward-looking detection systems 6 for detecting oncoming traffic 3 in one or more lanes 2 adjacent to the lane 7 travelled by the host vehicle 1.

In some embodiments hereof the one or more forward-looking detection systems 6 comprises one or more of a Radio Detection And Ranging (RADAR) sensor, a Light Amplification by Stimulated Emission of Radiation (LASER) sensor, a Light Detection And Ranging (LIDAR) sensor, an ultrasound sensor, an infrared sensor, one or several image sensors, or any combination thereof.

At least one image sensor may be a video sensor, designed as either a Charge-Coupled Device (CCD) camera or a Complementary Metal-Oxide Semiconductor (CMOS) camera, for example. Two or more images sensors may be used for stereo vision.

The vehicle safety arrangement furthermore comprises one or more rearward-looking detection systems 8 for detecting other vehicles 9 approaching the host vehicle 1 from behind.

In some embodiments hereof the one or more rearward-looking detection systems 8 comprises one or more of a RADAR sensor, a LASER sensor, a LIDAR sensor, an ultrasound sensor, an infrared sensor, one or several image sensors, or any combination thereof At least one image sensor may here also be a video sensor, designed as either a CCD camera or a CMOS camera, for example. Two or more images sensors may be used for stereo vision.

The vehicle safety arrangement furthermore comprises one or more turning intention detection systems 10, for determining an intention of a driver of the host vehicle 1 or an autonomous travel control arrangement to turn across an adjacent lane 2.

Intention to turn across a lane 2 containing oncoming traffic 3 is determined by the one or more turning intention detection systems 10 from one or more parameters indicative of actual vehicle conditions, such as left or right hand steering wheel movement or turning of the steerable wheels 5 of the host vehicle 1 (i.e., steering angular rate), steering angle, information on the extension of the road from at least one of a camera sensor, a map data system and a navigation system such as a GPS system or a fusion of data from any number of suitable sensors, such as those described above. In that regard, the turning intention detection system 10 may comprise one or more such sensors.

The vehicle safety arrangement furthermore comprises means for determining standstill 11 of the host vehicle 1. The means for determining standstill 11 of the host vehicle 1, i.e. if the host vehicle 1 has stopped, are arranged to determine standstill of the host vehicle 1 from one or several vehicle speed sensors. Alternatively, the vehicle speed may also be obtained from a transmission sensor or from a navigation system such as GPS system or equivalent. In that regard, the means 11 for determining standstill may comprise one or more such sensors and/or systems.

The vehicle safety arrangement further comprises a control unit 12 arranged to, during determined standstill of the host vehicle 1 and a determined intention to turn across a lane 2 containing oncoming traffic 3, determine a risk of the host vehicle 1 being hit from behind and, upon determining a high risk of the host vehicle 1 being hit from behind, generate and send a control signal to a vehicle EPAS control unit 13, which EPAS control unit 13, in response to receiving such a control signal, is arranged to cause the EPAS 4 to align the steerable wheels 5 of the host vehicle 1 such that any pushing of the vehicle, as a result of the vehicle being hit by another vehicle 9 approaching the host vehicle 1 from behind, only will cause the host vehicle 1 to move in the current lane 7, and thus not into any lane 2 containing oncoming traffic 3.

The control unit 12 suitably comprises a processing unit, such as a computer processor and appropriate software for controlling operation thereof. Such a processing unit and/or other similar processing units may be configured for use in performing the detecting, determining and/or any of the other operations, functions and/or steps of the systems and methods described herein. Such processing unit(s) may also comprise a part of any systems and/or means described herein for performing any such operation, functions and/or steps.

Also, in some embodiments hereof, the control unit 12 is further arranged to determine the risk of the host vehicle 1 being hit from behind based on fused information from two or more sensors of the rearward-looking detection systems 8, which provides for a simple and reliable high quality determination.

In further embodiments hereof, the control unit 12 is further arranged to, upon determining the risk of the host vehicle 1 being hit from behind, weight in the risk of the host vehicle 1 being pushed into an adjacent lane 2 containing oncoming traffic 3 if being hit from behind.

Weighting in the risk of the host vehicle 1 being pushed into an adjacent lane 2 containing oncoming traffic 3, if being hit from behind by another vehicle 9, provides for a risk determination that accounts also for the consequences of the host vehicle 1 being hit from behind.

Also, in embodiments hereof, vehicle safety arrangement further comprises means 14 for determining an intention of the vehicle driver or an autonomous travel control arrangement to resume forward travel of the host vehicle 1. For this purpose the control unit 12 is further arranged to release the aligning of the steerable wheels 5 of the host vehicle 1 in response to such intention to resume forward travel being determined. Resumption of intentional forward travel may e.g. be determined from movement of the accelerator pedal or equivalent.

Figure 3A:
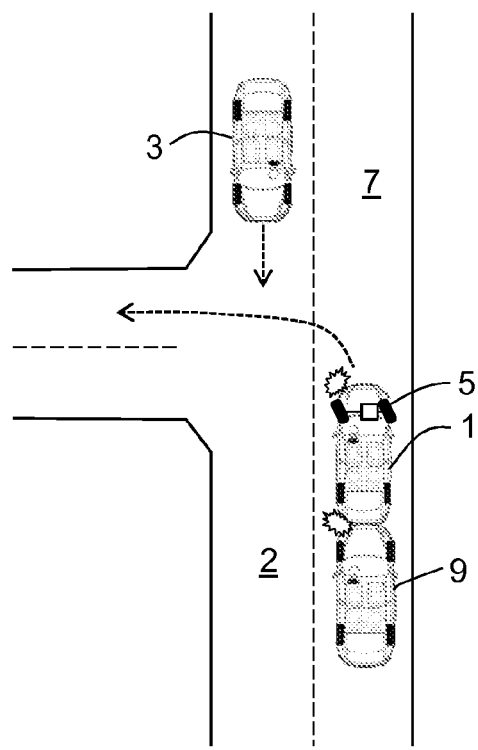
FIG. 3a is a schematic illustration of a prior-art vehicle being struck from behind by another vehicle when preparing to turn left at an intersection.

FIG. 3a is a schematic illustration of a prior-art vehicle 1 being struck from behind by another vehicle 9 when preparing to turn left at an intersection. Here the driver of the prior-art vehicle 1, when waiting to make a left turn, has turned the steerable wheels 5 of the prior-art vehicle 1 slightly left.

Figure 3B:
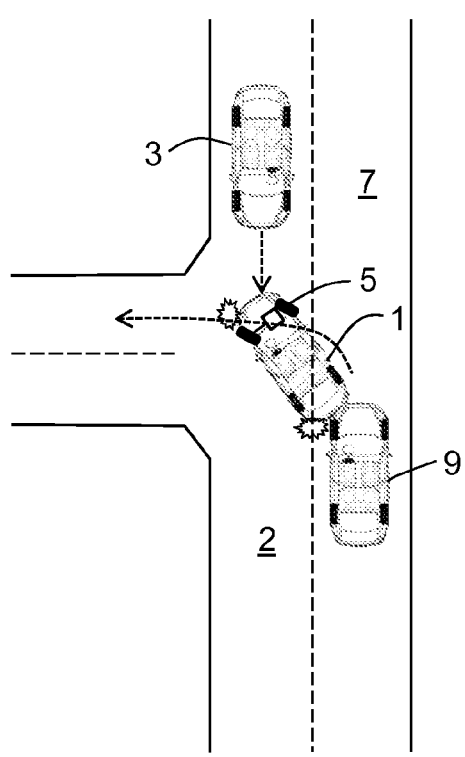
FIG. 3b is a schematic illustration of the prior-art vehicle of FIG. 3a being pushed into oncoming traffic as a result of being struck from behind by the other vehicle.

As a result thereof, as illustrated in FIG. 3b, the prior-art vehicle 1 of FIG. 3a is pushed into the adjacent lane 2 containing oncoming traffic 3 as a result of accidentally being struck from behind by the other vehicle 9, potentially resulting in a serious accident.

FIG. 4a is a schematic illustration of a motor vehicle 1 comprising a vehicle safety arrangement according to embodiments hereof being struck from behind by another vehicle 9 when preparing to turn left at an intersection. Here the driver of the host vehicle 1 or an autonomous travel control arrangement, when waiting to make a left turn, may or may not have turned the steerable wheels 5 of the host vehicle 1 to the left.

As illustrated schematically in FIG. 4b, the vehicle safety arrangement will, during determined standstill of the host vehicle 1 and a determined intention to turn across the lane 2 containing oncoming traffic 3, cause the EPAS 4 to align the steerable wheels 5 of the host vehicle 1 such that any pushing of the vehicle, as a result of the vehicle being hit by the other vehicle 9 approaching the host vehicle 1 from behind, only will cause the host vehicle 1 to move in the current lane 7, and thus not into the lane 2 containing oncoming traffic 3.

This will be the case irrespective of if the driver of the host vehicle 1 or an autonomous travel control arrangement, when waiting to make the left turn, has turned the steerable wheels 5 of the host vehicle 1 to the left or not.

According to the present application is also envisaged a method for preventing or mitigating accidents when turning a host vehicle 1 across lanes 2 with oncoming traffic 3, the host vehicle 1 further comprising an EPAS 4 operable to steer one or more wheels 5 of the host vehicle 1. The method comprises the steps of: detecting oncoming traffic 3 in one or more lanes 2 adjacent to the lane 7 travelled by the host vehicle 1 using one or more forward-looking detection systems 6; detecting other vehicles 9 approaching the host vehicle 1 from behind using one or more rearward-looking detection systems 8; determining an intention to turn across an adjacent lane 2 using one or more turning intention detection systems 10; determining standstill of the host vehicle 1 using means for determining standstill 11 of the host vehicle 1; arranging a control unit 12 to, during determined standstill of the host vehicle 1 and a determined intention to turn across a lane 2 containing oncoming traffic 3, determine a risk of the host vehicle 1 being hit from behind; and, upon determining a high risk of the host vehicle 1 being hit from behind, generate and send a control signal to a vehicle Electrical Power Assisted Steering control unit 13, and arranging the Electrical Power Assisted Steering control unit 13 to, in response to receiving such a control signal, cause the Electrical Power Assisted Steering 4 to align the steerable wheels 5 of the host vehicle 1.

Thus, the method ensures that any pushing of the host vehicle 1, as a result of the host vehicle 1 being hit by another vehicle 9 approaching the host vehicle 1 from behind, only will cause the host vehicle 1 to move in the current lane 7, and thus not into any lane 2 containing oncoming traffic 3.

The vehicle safety arrangement according to embodiments hereof will, although described above for left turns, work conversely for right turns, which is especially important for left-hand traffic countries.

Thus, hereby is provided for protecting the host vehicle 1 and any occupants of the host vehicle 1 should the host vehicle 1 suffer a collision from behind when preparing to turn across oncoming traffic 3.

According to the present application is also envisaged a motor vehicle 1 that comprises a vehicle safety arrangement for preventing or mitigating accidents when turning across lanes 2 with oncoming traffic 3 in a vehicle 1 hosting the arrangement, the host vehicle 1 further comprising an Electrical Power Assisted Steering 4 operable to steer one or more wheels 5 of the host vehicle 1 as described herein.

The above-described embodiments may be varied within the scope of the following claims. Further modifications of the disclosure within the scope of the appended claims are also feasible. While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle safety arrangement for a host vehicle, the arrangement for preventing or mitigating accidents when the host vehicle turns across lanes with oncoming traffic, the host vehicle comprising an Electrical Power Assisted Steering (EPAS) operable to steer one or more steerable wheels of the host vehicle, the arrangement comprising:
   one or more forward-looking detection systems for detecting oncoming traffic in one or more lanes adjacent to a lane traveled by the host vehicle;
   one or more rearward-looking detection systems for detecting other vehicles approaching the host vehicle from behind;
   one or more turning intention detection systems for determining an intention to turn across an adjacent lane;
   means for determining standstill of the host vehicle; and
   a control unit arranged to, during a determined standstill of the host vehicle and a determined intention to turn across a lane containing oncoming traffic, determine a risk of the host vehicle being hit from behind and, upon determining a high risk of the host vehicle being hit from behind, generate and send a control signal to a vehicle Electrical Power Assisted Steering (EPAS) control unit;
   wherein the EPAS control unit, in response to receiving the control signal, is arranged to cause the EPAS to align the steerable wheels of the host vehicle such that any pushing of the host vehicle as a result of the host vehicle being hit from behind will cause the host vehicle to move substantially in the lane traveled by the host vehicle.

2. The vehicle safety arrangement according to claim 1, wherein the one or more forward-looking detection systems comprises one or more of a radar sensor, a laser sensor, a lidar sensor, an ultrasound sensor, an infrared sensor, and an image sensor.

3. The vehicle safety arrangement according to claim 1, wherein the one or more rearward-looking detection systems comprises one or more of a radar sensor, a laser sensor, a lidar sensor, an ultrasound sensor, an infrared sensor, and an image sensor.

4. The vehicle safety arrangement according to claim 1, wherein the one or more turning intention detection systems are arranged to determine an intention to turn across an adjacent lane from one or more parameters, including left or right hand steering wheel movement, turning of the steerable wheels of the host vehicle, steering angle, and information on the extension of the road from at least one of a camera sensor, a map data system, and a navigation system.

5. The vehicle safety arrangement according to claim 1, wherein the means for determining standstill are arranged to determine standstill of the host vehicle from at least one of a vehicle speed sensor, a transmission sensor, and a navigation system.

6. The vehicle safety arrangement according to claim 3, wherein the control unit is further arranged to determine the risk of the host vehicle being hit from behind based on fused information from two or more sensors of the rearward-looking detection systems.

7. The vehicle safety arrangement according to claim 1, where the control unit is further arranged to, upon determining the risk of the host vehicle being hit from behind, weigh in the risk of the host vehicle being pushed into an adjacent lane containing oncoming traffic if being hit from behind.

8. The vehicle safety arrangement according to claim 1, further comprising means for determining an intention to resume forward travel of the host vehicle, and wherein the control unit is further arranged to release the aligning of the steerable wheels of the host vehicle in response to such intention to resume forward travel being determined.

9. A method for preventing or mitigating accidents when turning a host vehicle across lanes with oncoming traffic, the host vehicle comprising an Electrical Power Assisted Steering (EPAS) operable to steer one or more steerable wheels of the host vehicle, the method comprising:

- detecting oncoming traffic in one or more lanes adjacent to a lane travelled by the host vehicle using one or more forward-looking detection systems;
- detecting other vehicles approaching the host vehicle from behind using one or more rearward-looking detection systems;
- determining an intention to turn across an adjacent lane using one or more turning intention detection systems;
- determining a standstill of the host vehicle using means for determining standstill of the host vehicle;
- during a determined standstill of the host vehicle and a determined intention to turn across a lane containing oncoming traffic, determining a risk of the host vehicle being hit from behind using a control unit;
- upon a determined high risk of the host vehicle being hit from behind, generating and sending a control signal to a vehicle Electrical Power Assisted Steering (EPAS) control unit using the control unit; and
- in response to the control signal, controlling the EPAS to align the steerable wheels of the host vehicle using the EPAS control unit such that any pushing of the host vehicle as a result of the host vehicle being hit from behind will cause the host vehicle to move substantially in the lane traveled by the host vehicle.

10. A motor vehicle comprising a vehicle safety arrangement according to claim 1.

* * * * *